Jan. 13, 1925.

R. A. BROOKS 1,522,493

SECTIONAL MOLD FOR TREATING TIRES

Original Filed March 10, 1921    2 Sheets-Sheet 1

Inventor:
Roscoe A Brooks
By Chamberlin & Mendenreich
Attys

Jan. 13, 1925.
R. A. BROOKS
1,522,493
SECTIONAL MOLD FOR TREATING TIRES
Original Filed March 10, 1921     2 Sheets-Sheet 2
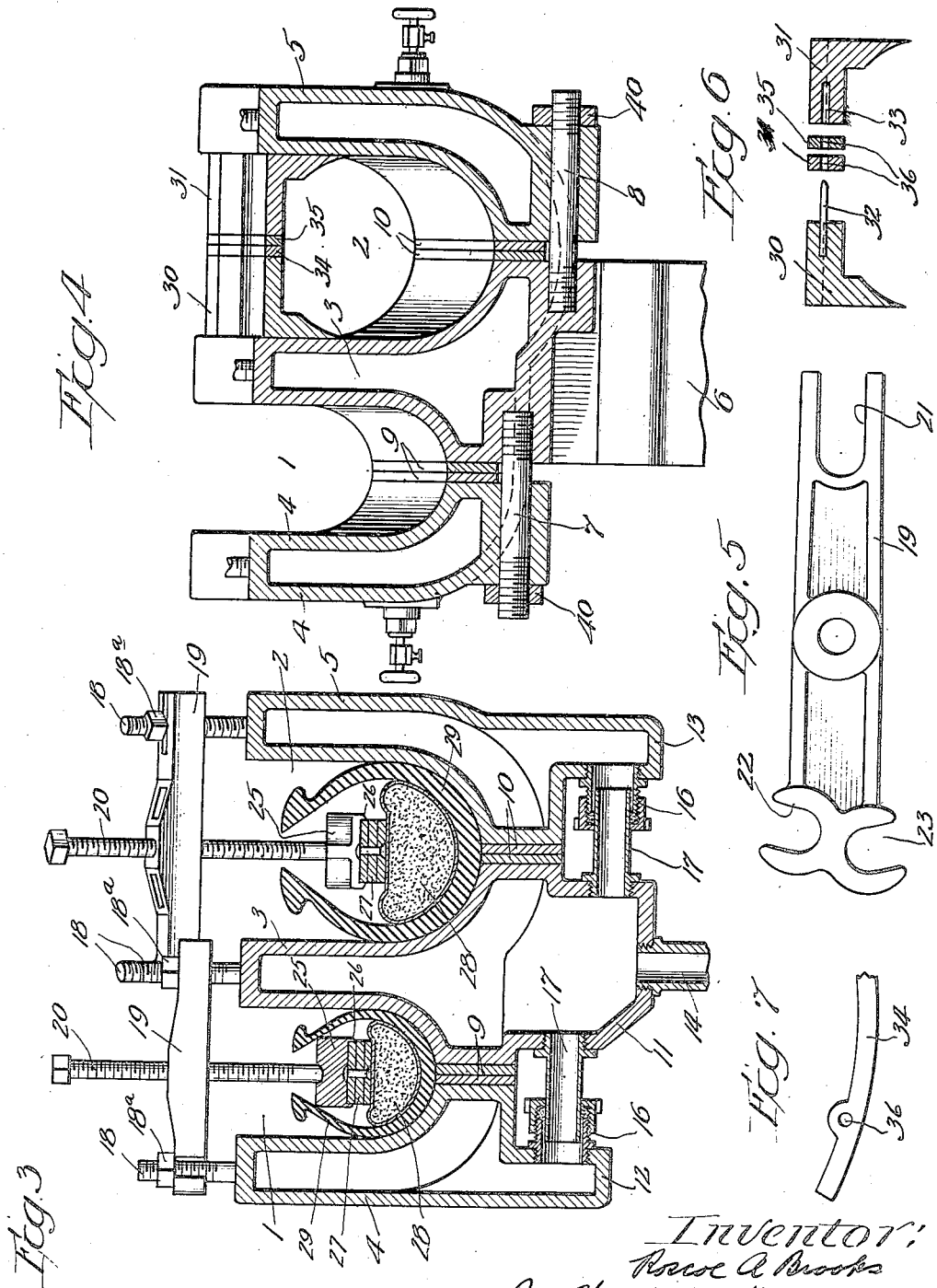

Patented Jan. 13, 1925.

1,522,493

UNITED STATES PATENT OFFICE.

ROSCOE A. BROOKS, OF CHICAGO, ILLINOIS, ASSIGNOR, BY MESNE ASSIGNMENTS, TO WESTERN VULCANIZING EQUIPMENT COMPANY, A CORPORATION OF ILLINOIS.

SECTIONAL MOLD FOR TREATING TIRES.

Application filed March 10, 1921, Serial No. 451,412. Renewed June 28, 1923.

*To all whom it may concern:*

Be it known that I, ROSCOE A. BROOKS, a citizen of the United States, residing at Chicago, county of Cook, State of Illinois, have invented a certain new and useful Improvement in Sectional Molds for Treating Tires, and declare the following to be a full, clear, and exact description of the same, such as will enable others skilled in the art to which it pertains to make and use the same, reference being had to the accompanying drawings, which form a part of this specification.

In my prior Patent No. 1,368,478 dated February 15, 1921, I have illustrated a sectional mold adjustable to tires of various sizes within limits, the walls of the mold being hollow and serving as steam chests. Steam is supplied to each section of the mold independently of the other section, necessitating a number of flexible connections adapted to permit the adjustments of the mold to be made. These steam connections are inconvenient and sometimes accidentally become detached so as to endanger the safety of the workmen.

One of the objects of the present invention is to produce a sectional tire mold in which the steam compartments in independent sections are joined together in a simple and efficient manner permitting ready adjustment and detachment of the sections from each other, reducing the number of steam connections to a minimum, and permitting the connections to be made of such a permanent character that the danger of accidental uncoupling is avoided.

My invention has for a further object to produce a simple and novel pressure device for pressing the work into intimate contact with the walls of the mold.

In some instances the pressure device includes a spring of the character illustrated in my prior Reissue Patent No. 14,852 dated May 4, 1920, and, viewed in one of its aspects, my invention may be said to have for its object to produce a simple and novel means for centering the spring and distributing the applied pressure along the same.

For some kinds of work air bags and curved plates known as bead molds are used, bead molds of different widths being required to fit the various widths which the mold cavity in the main mold may take. Instead of having a full set of complete molds it is advantageous to divide the bead molds in the same way as the main mold and vary the width by means of detachable spacers between the two halves. One of the objects of the present invention is to produce a simple and novel divided bead mold and co-operating spacers such that any desired width of bead mold may easily be built up and, when built up, will require no attention or care to prevent accidental displacement while in the main mold cavity.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 3 is a section taken approximately on line 3—3 of Fig. 1, tires being shown in each of the two molds;

Fig. 4 is a section taken approximately on line 4—4 of Fig. 1, the tires being omitted and a bead mold being shown in one of the mold cavities;

Fig. 5 is a plan view of one of the bridge bars forming part of a pressure device for producing pressure on the work;

Fig. 6 is a transverse section, similar to that in Fig. 4, but on a different plane, through my improved bead mold showing it and two spacers separated from each other; and Fig. 7 is a side elevation of one end of one of the spacing strips for the bead mold.

Figure 1:
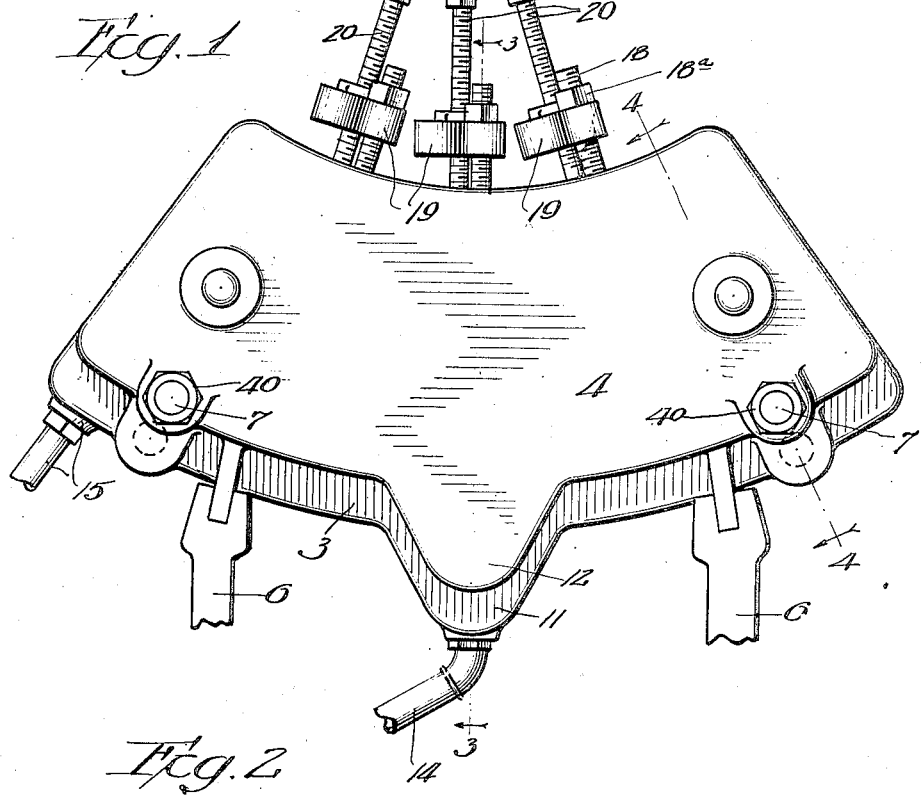
Figure 1 is a side elevation of a double mold arranged in accordance with my invention.
Figure 2:
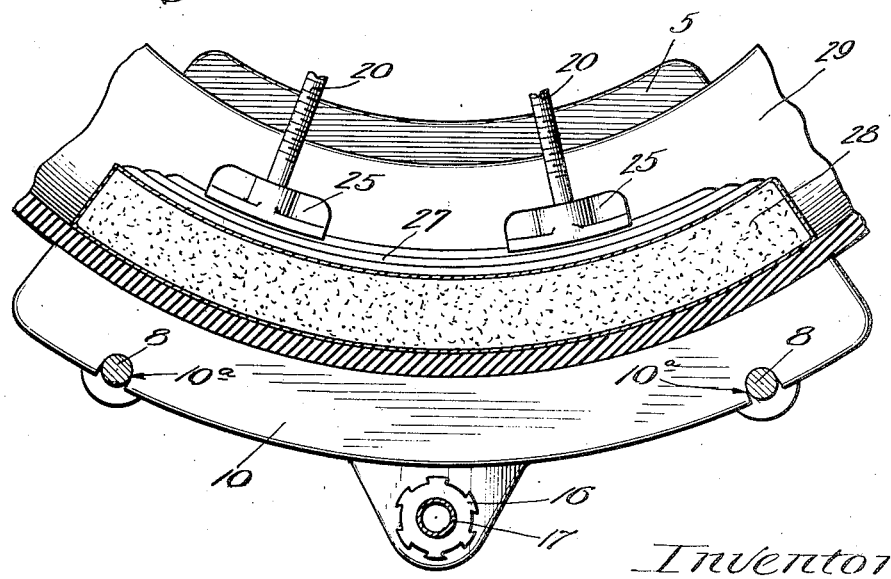
Fig. 2 is a longitudinal vertical section taken through one of the mold cavities, a tire being shown in place therein.

Referring to the drawings, 1 and 2 are two mold cavities in the form of arc-shaped troughs, the first being smaller than and adapted to receive smaller tires than the other. In the arrangement shown, the double mold into which these cavities are contained is made out of three pieces, a central member, 3, and two co-operating side members, 4 and 5; one-half of each of the mold cavities being bounded by the member 3, the remaining half of one of the cavities by the member 4, and the remaining half of the other cavity by the member 5. The members 3, 4 and 5 are made hollow so that they constitute in effect steam chests extending along the sides and across the bottoms of the mold cavities. The several members of the mold may be secured together and supported in any suitable way. In the arrangement shown, the central member, 3, is supported on suitable standards, 6, while the members 4 and 5 are supported from the central member and rigidly held thereto by means of suitable studs, 7 and 8, as best shown in Fig. 4. Each of the mold cavities may be made larger or smaller by employing spacers such as indicated at 9 and 10 between the member 3 and the members 4 and 5 respectively; the studs being long enough to permit the desired adjustments to be made. The spacers are preferably made comparatively thin so that, if the user is supplied with several similar spacers, he can secure a variety of different mold cavity widths. The spacers are preferably so shaped that they will rest upon the studs, 7 and 8, respectively; notches, such as indicated at 10a in Fig. 2, being provided in the lower edges of the spacers to receive the studs.

The steam is delivered into the interior of the central member and from there is distributed to the two side members of the mold. In the arrangement shown, each of the mold members has a downwardly-projecting portion at the bottom thereof and about midway between the ends, as indicated at 11, 12 and 13 respectively. A steam inlet pipe, 14, is connected with the part 11 of the central member. Another pipe, 15, may be connected to the central member of the mold near one end thereof, either for the escape of steam or for the entry of steam. The members 11 and 12 have in the sides thereof facing each other aligned openings with one of which is associated a suitable stuffing box, 16, while the other is provided with an outwardly-projecting tube or elongated nipple, 17, fitting slidably into the stuffing box. By this means the chambers in the members 3 and 4 are connected together, the connection being automatically effected when these two mold sections are assembled together, being automatically broken when the section 4 is removed, and being automatically maintained during the adjustment of the members 3 and 4 from and toward each other for the purpose of varying the size of the mold cavity. The chambers in the parts 11 and 13 are placed in communication with each other in the same manner as the chambers in the parts 11 and 12 namely, by means of a stuffing box, 16, and a nipple, 17.

It will thus be seen that the steam connection or connections having once been made to an apparatus, nothing further need be done by the workman in the way of steam fitting, either when adjusting the sizes of the mold cavities or when assembling or taking apart the mold, the connections between the various chambers of the mold being automatically made and interrupted as required. It will also be seen that by making the members 4 and 5 in rights and lefts, individual molds each having but a single mold cavity may be made by simply placing together two co-operating mold halves one of which has a stuffing box and the other a pipe or nipple adapted to enter the same.

It is necessary to press the work into molds of this kind, this being usually accomplished by suitable screw threaded devices entering the mouths of the molds. In the arrangement shown, each mold section is provided in its upper edge with a plurality of upwardly-projecting studs, 18, arranged in pairs one opposite the other. A suitable beam or bridge piece, 19, is adapted to extend between each pair of studs and across the top of the corresponding mold; a long screw, 20, passing through the middle of the beam or bridge piece and being adapted to enter the mold cavity. The fact that the mold cavities are adjustable in width makes it necessary to use a special kind of bridge piece. In the arrangement shown, each bridge piece has a jaw, 21, opening out of one end thereof while at the other end it has two jaws, 22 and 23, respectively, opening out of opposite sides of the bridge piece and differently placed in the direction of the length of the bridge piece. In using the bridge piece, the jaw 21 is slipped upon one of the studs with which it is to co-operate and then either the jaw 22 or the jaw 23 is hooked upon the other stud; the jaw 22 being selected when the mold cavity is adjusted to one of its smaller sizes, and the jaw 23 being selected when the mold is adjusted to one of its larger sizes; the purpose being to bring the pressure screw approximately at the longitudinal center of the mold cavity, regardless of the size of the cavity. The top of the bridge piece abuts against shoulders, which may conveniently take the form of nuts, 18a, on said studs to resist the upward pressure on the screw when the latter is forced down against the work.

The number of pressure screws that may be employed in connection with each mold cavity is of course quite limited and sometimes it is difficult to secure as even a distribution of pressure as is desired. For the purpose of securing a maximum distribution of the pressure I provide shoes, 25, with which the lower ends of the screws 20 engage; the shoes being of considerable length in the direction of the length of the mold cavities so as to distribute the pressure. In fact, the shoes may be so shaped that they will touch the parts on which they rest only at the ends of the shoes, thus causing the pressure which is applied to the shoes midway between the ends thereof to be transmitted by the shoes at two points spaced apart lengthwise of the mold. Furthermore, the shoes may be provided with depending flanges or ribs, 26, at the sides, whereby when a shoe is set upon a pressure spring or plate such as indicated at 27, the shoe tends to hold the latter in the longitudinal center of the mold and prevent it from being displaced laterally. The spring clamping or pressure member, 27, shown in Figs. 2 and 3, rests upon a sand bag, 28, lying within a tire, 29, as disclosed in my prior Reissue Patent 14,852 dated May 4, 1920, but my improved shoe may be used in connection with other types of springs or plates.

When the work requires the use of bead plates or molds, I prefer to make the latter as shown in Figs. 4, 6 and 7, each bead mold consisting of two halves, 30 and 31, meeting along the same plane as the two halves of the main mold. One of the halves of the bead mold for example, the part 30, is provided with long dowel pins, 32, projecting laterally from the inner edge thereof while the other half of the bead mold is provided with holes or sockets, 33, into which the dowel pins are adapted to fit to unite the two halves. In order to increase the width of the bead mold, spacers similar to the spacers 9 and 10 are placed between the two halves. In the drawings I have shown two such spacers, 34 and 35, respectively, these being similar to each other and each having a thickness equal to the thickness of one of the spacers 9 or 10; thus insuring that the proper adjustment of the bead mold will be secured when it is made to contain the same number of spacers as have been placed between the sections of the main mold. The spacers 34 and 35 are provided with holes, 36, extending through the same and so located therein that the dowel pins, 32, may be passed through the same. In other words, each spacer is slipped on the dowel pins after the two halves of the bead mold are separated so that, upon bringing the two halves of the bead mold together, the spacer is positively locked in position and cannot be accidentally removed or displaced. The dowel pins are made long enough to permit them to receive as many of the spacing devices as may at any time be required, and still leave portions of the dowel pins exposed for the purpose of entering the holes 33.

There is one advantage possessed by my improved mold that should perhaps be explained. It is always easier to place the work in the mold when the mold is expanded and, after the treatment in the mold has been completed it is easier to take the work out by opening the mold than by attempting to remove the work while the mold remains in the condition existing during the time the work was being treated. The halves of each main mold may be separated at will and again brought together, as heretofore explained, without disturbing any of the steam connections and without making it necessary to shut off the steam. Furthermore, whenever the steam is on, there is a tendency to press the mold members 1 and 2 laterally and away from the member 3. Therefore, when it is desired to open up a mold, the nuts, 40, on the corresponding studs are turned back while the steam is on, and the steam pressure serves to push the movable mold member along after the nuts. The studs are made long enough so that a considerable opening of the molds may be effected without removing the nuts completely and therefore without necessitating that the steam be shut off. When it is desired to close the mold, this may readily be accomplished while the steam is on by reason of the powerful pressure which may be exerted on the movable mold member upon applying a wrench to the nuts.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A tire mold in the form of a longitudinally-curved trough divided into two parts along a longitudinal plane, the walls of said trough being hollow and being so shaped that sections on the inner sides thereof at the bottom are spaced apart from each other when the two parts of the mold are placed together, said sections having aligned openings therein, a stuffing box lying between said sections and fitted into one of said openings, and a nipple secured in the other of said openings and fitting slidably into said stuffing box.

2. A tire mold in the form of a longitudinally-curved trough divided into two parts along a longitudinal plane and provided with hollow walls, one of said parts having a stuffing box outside of the mold cavity and directed toward the other part, the latter part having a nipple fitting slidably into said stuffing box, and means for spreading the parts of the mold apart to enlarge the mold cavity, the nipple extending far enough into said stuffing box to permit the mold to be so spread apart without disconnecting the nipple from the stuffing box.

3. A tire mold in the form of a longitudinally-curved trough divided into two parts along a longitudinal plane and provided with hollow walls, a detachable spacer adapted to fit between the meeting edges of the divided trough bottom to increase the width of the mold cavity, means for detachably securing said parts together either with the spacer in the positon or with the spacer left out, one of said parts having an opening communicating with the interior thereof and provided with a stuffing box, and the other of said parts having an opening communicating with the interior thereof and provided with a nipple fitting slidably into said stuffing box and serving to maintain the interiors of the two parts of the mold in communication with each other when the two parts of the mold are secured together either with the spacer in position or with the spacer left out.

4. A bridge piece for use in an apparatus of the character described comprising a bar having in one end an elongated jaw opening out through that end and having in the vicinity of the other end two jaws opening out at opposite sides of the bar and placed at unequal distances from the other jaw.

5. A tire mold in the form of a longitudinally-curved trough divided into two parts along a longitudinal plane, means for adjusting said mold so as to vary the width of the mold cavity, posts projecting upwardly from the sides of said mold and having downwardly-facing shoulders near the top thereof, a bridge piece having a jaw opening out of one end thereof and adapted to engage with one of said posts and having near the other end a plurality of jaws opening outwardly at opposite sides of the bar, one or the other of the latter jaws being adapted to engage with the remaining posts, depending upon the adjustment of said mold.

In testimony whereof, I sign this specification.

ROSCOE A. BROOKS.